United States Patent
Radrizzani

(10) Patent No.: US 6,634,309 B2
(45) Date of Patent: Oct. 21, 2003

(54) DEVICE FOR REDUCING THE RESISTANCE TO THE ADVANCEMENT OF A MOTORBOAT ON WATER

(75) Inventor: Massimo Radrizzani, Saronno (IT)

(73) Assignee: SMC Searunner Motorboat Company S.r.l., Saronno (IT)

( * ) Notice: Subject to any disclaimer, the term of this patent is extended or adjusted under 35 U.S.C. 154(b) by 0 days.

(21) Appl. No.: 10/045,039

(22) Filed: Jan. 15, 2002

(65) Prior Publication Data

US 2002/0092457 A1 Jul. 18, 2002

(30) Foreign Application Priority Data

Jan. 15, 2001 (IT) .................................. MI2001A0060

(51) Int. Cl.[7] .............................. B63B 1/34; B63B 1/32
(52) U.S. Cl. ...................................... 114/67 R; 114/291
(58) Field of Search ............................. 114/67 A, 67 R, 114/291; 441/79; D12/313, 314

(56) References Cited

U.S. PATENT DOCUMENTS

| | | | | |
|---|---|---|---|---|
| 573,297 A | * | 12/1896 | Roberts ..................... | 114/67 R |
| 1,824,313 A | * | 9/1931 | Vogler ....................... | 114/67 A |
| 2,181,875 A | * | 12/1939 | Diehl ......................... | 114/291 |
| 2,396,721 A | * | 3/1946 | Patterson et al. ............ | 114/69 |
| 2,800,291 A | * | 7/1957 | Stephens ................... | 114/67 R |
| 3,599,259 A | * | 8/1971 | Shewmon ................... | 114/284 |
| 3,680,517 A | * | 8/1972 | Morrison .................... | 114/67 A |
| 4,348,195 A | * | 9/1982 | Lantz ......................... | 440/100 |
| 5,058,837 A | * | 10/1991 | Wheeler ..................... | 244/198 |
| 5,088,665 A | * | 2/1992 | Vijgen et al. ............... | 244/198 |
| 5,481,996 A | * | 1/1996 | Osawa et al. .............. | 114/67 R |
| 5,524,568 A | * | 6/1996 | Bobst ........................ | 114/67 A |
| 5,533,865 A | * | 7/1996 | Dassen et al. ............. | 244/199 |

* cited by examiner

Primary Examiner—S. Joseph Morano
Assistant Examiner—Andrew Wright
(74) Attorney, Agent, or Firm—Young & Thompson

(57) ABSTRACT

A device for reducing the resistance to the advancement on water of a motorboat (1), including a keel (2), on the underside of which at least one step (3) is provided; projecting element (6) for increasing the points of separation of the motorboat (1) from the water are provided at the step (3) and extend away from its free edge, on the projecting element (6) there acting the weight of the boat which is hence distributed over a greater number of points than those of the step (3), the projecting element provided regularity in the streams of air and water which flow below the keel (2) downstream of the projecting element, and creating a microvotex effect between the projecting element and the keel which contributes to the support of the boat, such that there is a smaller resistance to the advancement of the motorboat on water, with consequent higher boat speed.

15 Claims, 2 Drawing Sheets

DEVICE FOR REDUCING THE RESISTANCE TO THE ADVANCEMENT OF A MOTORBOAT ON WATER

BACKGROUND OF THE INVENTION

The present invention relates to a device for reducing advancement of a motorboat on water.

DESCRIPTION OF THE RELATED ART

A boat, and in particular a motorboat, is known to comprise a keel sometimes provided with one or more generally V-shaped steps or redans.

By virtue of these steps, when the motorboat attains speed and partially separates from the water there is an increase in the points at which the boat rests on the water in the region where it separates from this latter (generally where the step is appropriately provided) so as to distribute the load or weight of the motorboat over a plurality of support points. Microvortices also form below the boat at these steps, to create cushions which further increase the separation of the motorboat from the water. All this leads to an increase in the buoyancy of the boat which, by penetrating to a lesser extent into the water, offers less resistance to advancement and hence attains a higher speed than a boat with a non-stepped keel. An object of the invention is to provide a device able to further increase the positive effects generated on a motorboat by the presence of the step below its keel.

SUMMARY OF THE INVENTION

A particular object of the invention is to provide a device of the stated type which enables a reduction to be achieved in the load acting on each keel point wetted by the water along the step present in the keel (i.e. at those points at which the boat separates from the water surface), so as to further reduce (with respect to the known solution) the resistance exerted by the water on the motorboat during the movement of this latter, and hence increase the boat speed for equal powers delivered by the motor or motors.

BRIEF DESCRIPTION OF THE DRAWINGS

These and further objects which will be apparent to the expert of the art are attained by a device in accordance with the accompanying claims.

The present invention will be better understood from the accompanying drawing, which is provided by way of non-limiting example and in which.

DESCRIPTION OF THE PREFERRED EMBODIMENTS

Figure 1:
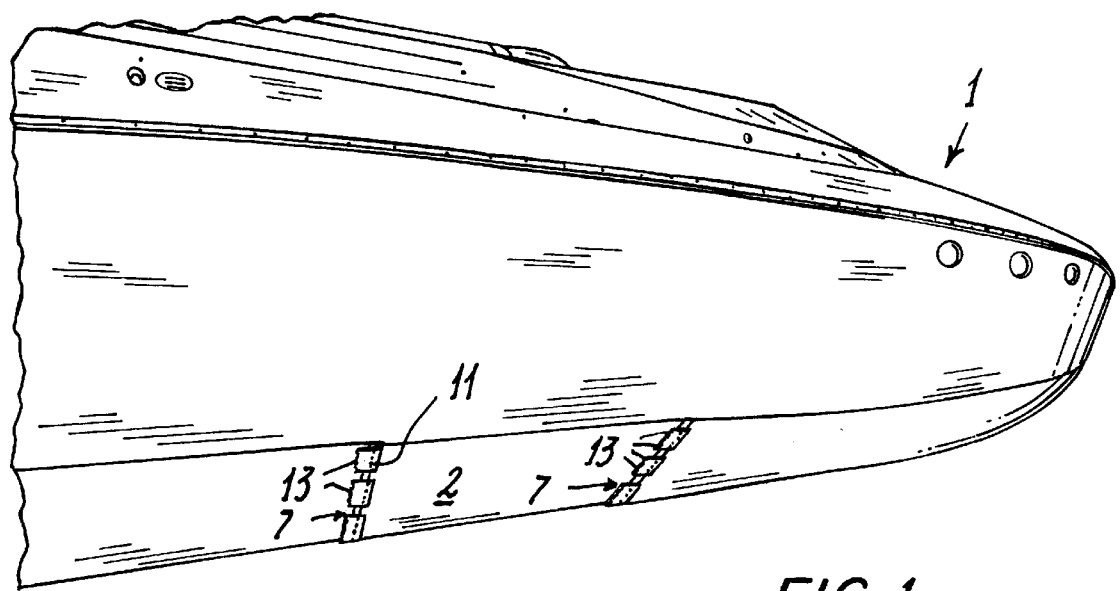
FIG. 1 is a perspective partial side view of a motorboat provided with a device according to the invention.
Figure 2:
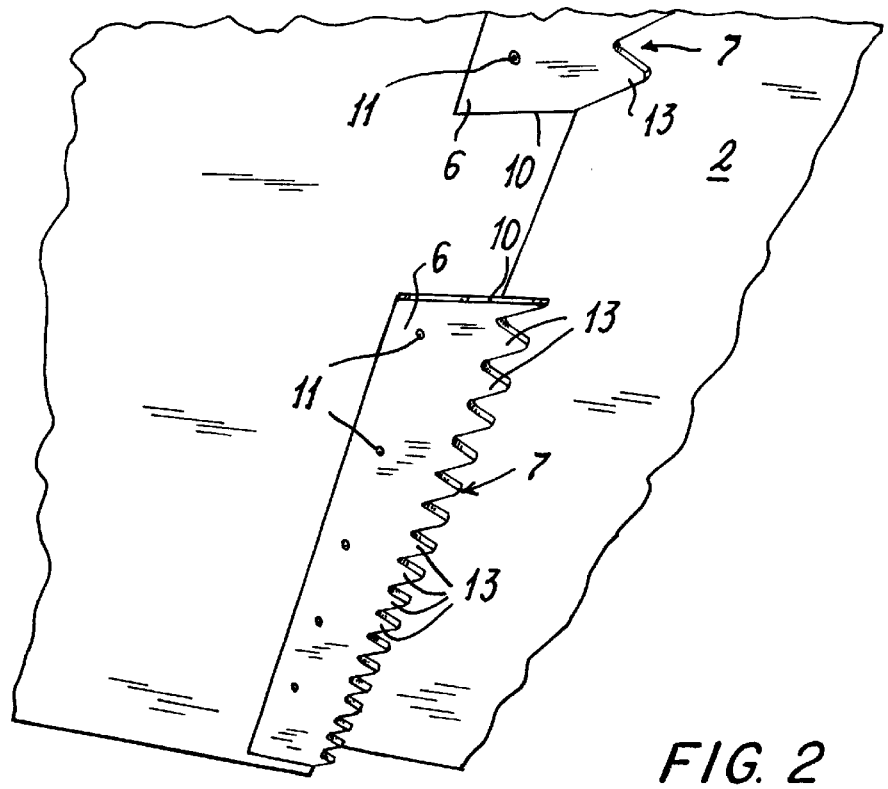
FIG. 2 shows a detail of the motorboat of FIG. 1, highlighting a part of the device of the invention.
Figure 3:
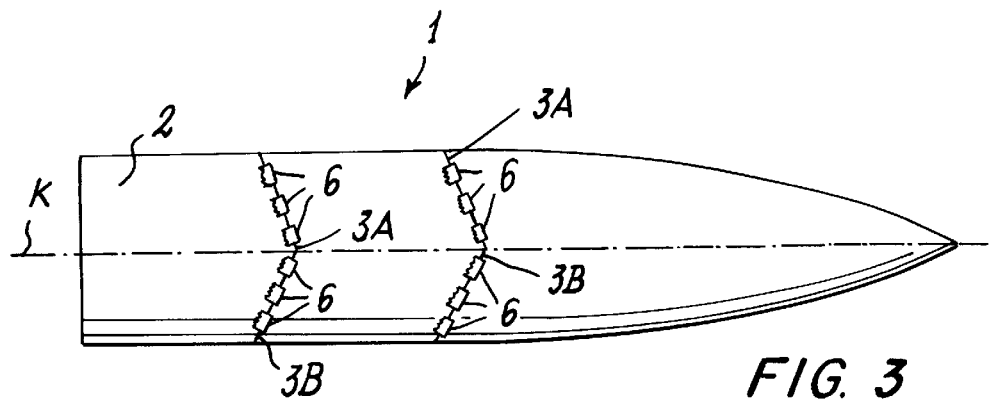
FIG. 3 is a view of the motorboat of FIG. 1 from below.
Figure 4:
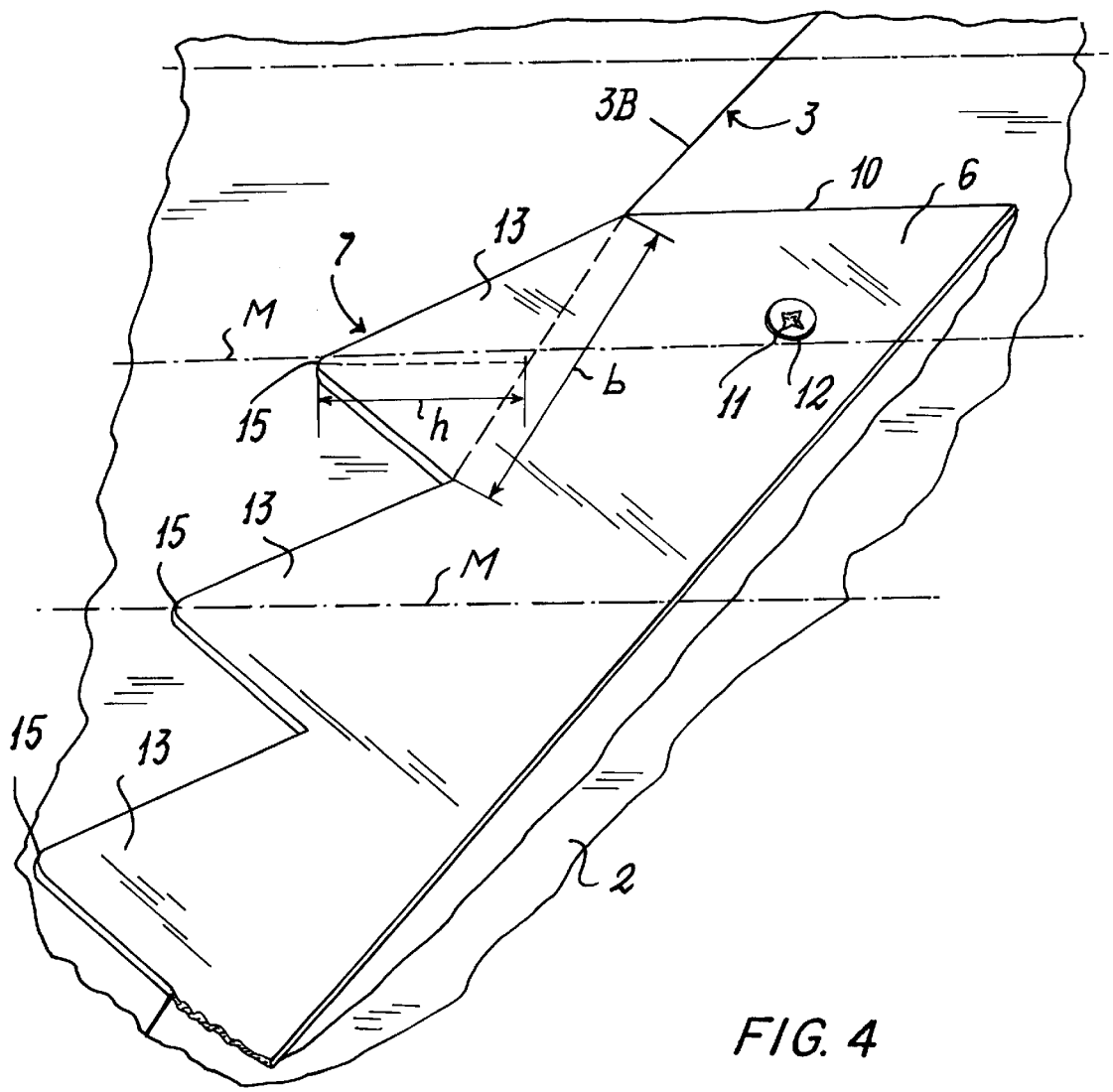
FIG. 4 is a view of a detail of the device of FIG. 1.

With reference to said figures, a motorboat is indicated overall by 1 and comprises a keel 2 below which, in the example, there are provided two steps or redans shaped substantially as a V, and presenting each arm 3A and 3B on the sides of the keel. The motorboat has a longitudinal axis K. On each step there is positioned a resistance-reducing device according to the invention. It comprises, in the embodiment of the invention shown in the figures, a plurality of bodies 6 presenting a saw-tooth (or comb) edge 7 projecting from the corresponding step arm 3A and 3B and positioned at a distance from that part of the keel 2 towards which said edge 7 faces. Alternatively a single body 6 can be associated with each step 6 or with each of its arms.

More specifically, in the example, each body 6 is inserted into a recess 10 provided in the keel in proximity to each step 3. This body is fixed to the keel by screws 11 cooperating with seats 12 provided in the body 6 and with bushes (not shown) embedded in the keel 2. Other fixing means (glues or the like) for fixing each body 6 to the keel 2 are however possible.

The body 6 is perfectly coplanar with the keel.

As stated, the edge 7 of the body 6 is of saw-tooth shape and comprises a plurality of triangular elements 13 the base b of which lies on a prolongation of the free edge of the step 3 (i.e. that edge where the keel 2 turns inwards to create the step) at the recess 10. Alternatively, the base b can lie in a plane displaced from the free edge of the step towards the edge 7 of the body 6.

Each triangular element has a base b with dimensions between 50% and 150% of the height of the step 3, and a height h between 50% and 150% of the height of the step. In addition, the median of each triangular element from that vertex 15 distant from the step 3 is parallel to the longitudinal axis K of the boat.

Each body 6 can also be formed in one piece with the keel 2 or be shaped as right angles, to be secured to the vertical part of the step; alternatively, a spacer can be positioned in proximity to the step in front of said vertical part, to enable the body 6 to be fixed by means thereof.

By virtue of the invention, an increase in the points of separation of the motorboat from the water is obtained, with a consequent reduction in the load acting on each of them (with respect to the solution in which the boat is provided with just the step 3). Consequently, a lower resistance to the motorboat advancement through the water is achieved together with a higher motorboat speed. This characteristic is accentuated if the base b of each triangular element 13 is displaced from the free edge of the step towards the exterior of this latter. This solution results in a larger air quantity being drawn from the lateral edges of the keel 2 between each body 6 and the keel which faces it; this air decreases the quantity of liquid which runs along the keel 2, to hence reduce the friction between the water and the keel.

In addition, regular air microvortices form below the triangular elements 13 to better support the boat than those vortices created at a step not provided with the bodies 6. These also contribute to an increase in the motorboat speed for equal motor power compared with a motorboat with equal motors but not provided with the invention.

Finally a very uniform ("combed") low-turbulence flow of air and water forms downstream of the triangular elements 13, which facilitates the advancement of the motorboat on the water. These effects are better obtained with a single body 6 associated with the step 3 or with each of its arms 3A and 3B.

What is claimed is:

1. A motorboat, comprising:
   a keel;
   at least one step provided on an underside of the keel; and
   a resistance-reducing device mounted on the keel in proximity to the at least one step and extending away from a closest free edge of the keel, wherein, an exposed surface of the resistance-reducing device is coplanar with the underside of the keel adjacent the resistance-reducing device, the resistance-reducing device includes projecting elements f or increasing points of separation of the motorboat from water, the projecting elements provide regularity in streams of air and water which flow below the keel downstream of the projecting elements, the projecting elements create a microvortex effect between the projecting elements and the keel to contribute to support of the motorboat.

2. The motorboat of claim 1, wherein the projecting elements comprise a saw-tooth edge projecting from the at least one step parallel to the keel.

3. The motorboat of claim 2, wherein the triangular elements comprise a projecting portion projecting from the at least one step between 50% and 150% of a height of the at least one step.

4. The motorboat of claim 2, wherein the at least one step comprises two arms in the shape of a V and is centered along a longitudinal axis of the keel, and a resistance-reducing device is mounted on each arm of the at least one step.

5. The motorboat of claim 4, comprising plural V-shaped steps provided on the underside of the keel, each step provided with a resistance-reducing device.

6. The motorboat of claim 1, wherein the resistance-reducing device comprises a plurality of bodies mounted along the at least one step, and the projecting elements of each body comprise a sawtooth edge projecting from the at least one step parallel to the keel.

7. The motorboat of claim 1, wherein the projecting elements of the resistance-reducing device comprise a plurality of triangular elements each having a base, each base being positioned on a prolongation of a free edge of the at least one step.

8. The motorboat of claim 7, wherein each triangular element has a median of the base parallel to a longitudinal axis of the motorboat.

9. The motorboat of claim 1, wherein the projecting elements of the resistance-reducing device comprise a plurality of triangular elements each having a base, each base being positioned displaced from a prolongation of a free edge of the at least one step.

10. The motorboat of claim 1, wherein the projecting elements of the resistance-reducing device comprise a plurality of triangular elements positioned along a free edge of the at least one step.

11. The motorboat of claim 1, wherein the resistance-reducing device is mounted in a recessed seat provided in the keel in proximity to the at least one step.

12. The motorboat of claim 1, wherein the resistance-reducing device is removably mounted to the keel.

13. The motorboat of claim 1, wherein the resistance-reducing device comprises a flat plate with the projecting elements extending from a rear edge of the plate running parallel to a longitudinal axis of the plate, the plate having parallel flat upper and lower surfaces extending from a front edge of the plate to the rear edge of the plate.

14. A motorboat keel, comprising:

a keel underside;

plural steps provided on the keel underside; and a resistance-reducing device mounted on the keel at each of the plural steps and extending toward a longitudinal axis of the keel, wherein, an exposed surface of the resistance-reducing device is coplanar with the underside of the keel adjacent the resistance-reducing device, the resistance-reducing device includes projecting elements for increasing points of separation of the motorboat from water, providing regularity in streams of air and water which flow below the keel downstream of the projecting elements, and creating a microvortex effect between the projecting elements and the keel to contribute to support of the motorboat.

15. A motorboat keel resistance-reducing device, comprising:

a flat plate with projecting elements extending from a rear edge of the plate running parallel to a longitudinal axis of the plate, the extending projecting elements shaped for increasing the points of separation of a motorboat keel from water, providing regularity in streams of air and water which flow below the keel downstream of the projecting elements, and creating a microvortex effect between the projecting elements and the keel to contribute to support of the motorboat, the plate having parallel flat upper and lower surfaces extending from a front edge of the plate to the rear edge of the plate.

* * * * *